March 14, 1950  G. D. CERF  2,500,345
MAGNETO
Filed July 25, 1947
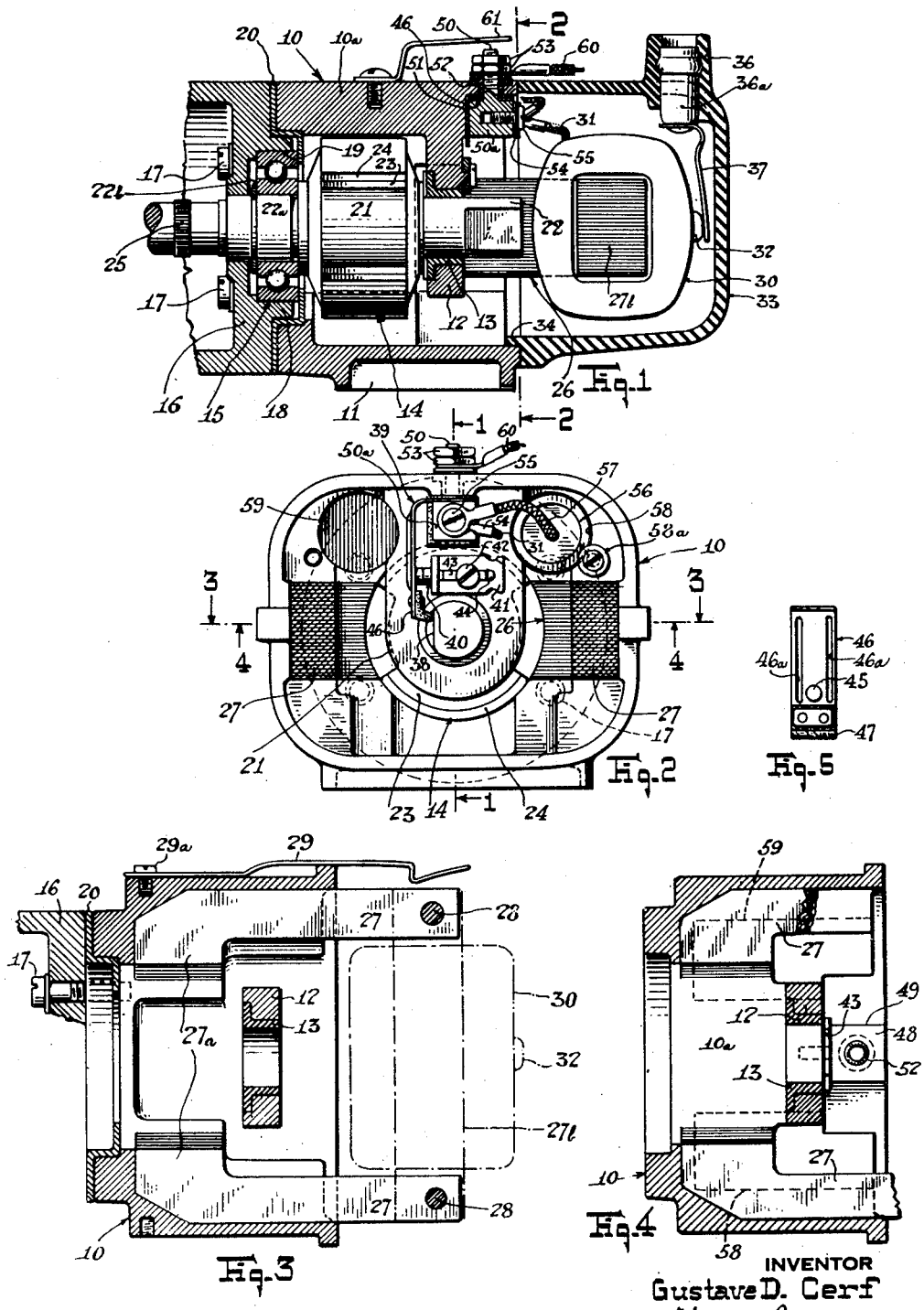
INVENTOR
Gustave D. Cerf
BY Henry Lanahan
ATTORNEY Patented Mar. 14, 1950

2,500,345

UNITED STATES PATENT OFFICE 2,500,345

MAGNETO

Gustave D. Cerf, Livingston, N. J., assignor, by mesne assignments, to Thomas A. Edison, Incorporated, West Orange, N. J., a corporation of New Jersey Application July 25, 1947, Serial No. 763,559

6 Claims. (Cl. 171—209)

This invention relates to a magneto for the ignition system of an internal combustion engine, particularly for that of a small engine.

It is an object to provide a small, compact and economical magneto for small industrial engines.

It is another object to provide such a magneto which is readily adapted for operation in either direction.

Another object is to provide a simple and effective circuit breaker for such reversible magneto.

Another object is to provide an improved and more economical magneto of the form having the stator thereof extending along the axis of rotation of the rotor.

These and other objects and features of my invention lie in the details of construction and cooperation of parts illustrated by the magneto herein shown and described, and will be apparent from the following description and the appended claims.

In the description of my invention reference is had to the accompanying drawings, of which:

Figure 1 is a principally axially sectional view, taken on the line 1—1 of Figure 2, of a magneto according to my invention;

Figure 2 is a sectional view at right angles to the axis of the magneto, taken substantially on the line 2—2 of Figure 1;

Figure 3 is a fractional section taken substantially on the line 3—3 of Figure 2;

Figure 4 is another fractional section taken substantially on the line 4—4 of Figure 2; and Figure 5 is an end view of the breaker arm of the circuit breaker.

The present magneto has a metal housing 10 made preferably by die casting and of light metal such as aluminum. The housing is substantially rectangular in shape as viewed from the ends. The ends of the housing are open and on one side thereof it is provided with a mounting base 11. Interiorly, near one end of the housing, there is an integral standard 12 extending from one side wall partially to the opposite wall as, for example, from an upper side 10a thereof towards the mounting base 11. This standard is apertured at the geometric center of the housing and in directions lengthwise of the housing. In this apertured portion of the standard there is mounted a bearing 13 of the oil-containing type, this being one bearing for a rotor 14 of the magneto. A second bearing 15 of the roller type is provided for the rotor and is carried by an end plate 16 held by four screws 17 to the end of the housing farthest from the standard 12. This end plate has an axially-extending boss 18 fitting interiorly into the housing and in this boss there is a circular cavity 19 receiving the outer race of the roller bearing 15. The roller bearing is retained in the cavity by a thrust washer and gasket 20 which is clamped tightly between the end plate and the housing.

The rotor 14 comprises a body 21 of one of the highly-efficient permanent-magnet materials made typically of aluminum, nickel, cobalt and iron, and known in the trade as "Alnico." The rotor has a shaft 22 on an intermediate portion of which the magnet body 21 is secured as by casting. The magnet body is preferably formed with diametrically-opposite, radially-projecting pieces forming poles 23 and on these poles are secured arcuate soft iron shoes 24. The shaft 22 has one end portion of uniform diameter, which is journalled in the bearing 13. The other end of the shaft has an enlarged diameter portion 22a fitting the inner race of the bearing 15. Just beyond this portion the shaft has an annular groove receiving a retaining washer 22b. Beyond this retaining washer the shaft extends through the end plate 16 and has on the outer end portion thereof an enlarged diameter portion 25 provided with a knurled peripheral surface adapted for interlocking connection with a driving member not herein necessary to show.

The housing 10 carries a stator 26 of a generally U form which has two legs 27, composed of lamination stacks, which have poles 27a for cooperation with the rotor 14. These stator legs are incast in the housing 10 and are disposed diametrically opposite the rotor 14 and along the axis thereof; also, these legs extend past the standard 12, respectively at clearance distances from the opposite sides thereof, and project beyond the end of the housing. Bridging the outer ends of the legs 27 is a laminated core 27b having for example alternate laminations interleaved with the end portions of the legs and held thereto by bolts 28. On this core there is an induction coil 30 having the usual primary and secondary windings. Each of these windings has one end thereof grounded to the stator, the secondary being grounded through the primary winding as is the standard practice. A connection to the other end of the primary winding is made by way of a lead 31 and to the secondary winding by way of a contact button 32 provided on the coil.

By placing the stator so that it extends longitudinally of the rotor axis the housing 10 may have a small area as viewed from the end (Figure 2) and the whole stator structure—the stator 26 and induction coil 30—will lie within this area and extend only a short axial distance from the housing. This extending portion of the stator is incased in a separate cup-shaped housing part or cap 33 made for example of a suitable insulating plastic. This cap has a flange 34 at its edges which fits into the open end of the housing 10. At opposite sides of the housing there are catch springs 29 secured thereto as by screws 29a, which have offset end portions adapted to hook into suitable recesses provided in the cap 33 to hold the latter in place on the housing. The cap has a boss 36 with a central aperture in which is mounted a terminal connector 36a. This terminal connector has secured to the inner end thereof a spring 37 which is adapted to press against the contact button 32 as the cap is mounted. The terminal connector 36a is adapted to receive a usual cable plug (not shown) for connecting the secondary winding to the ignition system of an engine.

It will be understood that the flux in the stator 26 is reversed recurrently as the rotor is turned to generate successive voltage impulses in the windings of the induction coil 30. In order that these voltages will be generated, it is essential that there be no shorted electrically-conductive paths around either of the stator legs 27. For this reason the standard 12 which carries the inner bearing 13 is terminated short of the opposite side wall of the casing. The standard, being made of non-magnetic material, has no magnetic influence on the flux in the stator. The use of such standard as an integral part of the metal housing 10 permits the housing to be made much more economically and more ruggedly than it would be were the inner bearing carried by a separate insulating body as has been heretofore done.

The shaft 22 is extended beyond the inner bearing 13 and provided with a flat to provide a breaker cam 38. In the space between the standard 12 and the induction coil 30 there is a circuit breaker generally referred to as 39. This circuit breaker comprises a stationary contact 40 carried by a turned-over end portion of a bracket 41 which is mounted on the outer face of the standard 12, the bracket being secured to the standard by a screw 42. The bracket is guided for adjustment in directions transverse to the shaft 22 by a rib 43 on the standard which engages a slit 44 in the bracket longitudinally thereof. The screw 42 passes through this slit at a point intermediate the length of the rib, and the rib is shorter than the slit to provide the desired range of adjustment of the stationary contact. Cooperating with the stationary contact 40 is a second movable contact 45 carried by a breaker arm 46. This breaker arm is a leaf spring having a free portion made rigid by two ribs 46a which were formed in the spring by a stamping operation and which extend lengthwise of the spring. The spring has a base portion turned over at right angles thereto and secured to the housing as is herein later explained. The curved portion of the spring joining the turned-over base to the free arm portion abovementioned is not ribbed so that it will be flexible and cause the arm to have effectively a hinged support. It is on the rigid portion of the arm that the movable contact 45 is mounted. On the free end of this rigid portion there is secured an insulating shoe 47 which is engaged by the breaker cam to operate the circuit breaker. The turned-over base portion of the breaker arm is clamped against a face 48 on a short interior boss 49 of the housing, this face being parallel with the rotor axis. The clamping is effected by a bolt 50 having a heavy substantially-cubical head 50a. The bolt passes through an aperture in the base portion of the breaker arm 46 and thence through the top wall 10a of the housing. The head of the bolt 50 has direct electrical contact with the breaker arm but the breaker arm and bolt are insulated from the standard 12 by an insulating plate 51; also, the bolt is insulated from the housing wall 10a by an insulating grommet 52. The bolt is held clamped in place by two nuts 53 threaded on the outer end portion thereof, one of these nuts serving as a lock nut. The outgoing lead 31 of the primary winding of the induction coil 30 is connected to a lug 54 which is secured by a screw 55 to the head of the bolt 50. When the insulating shoe 47 registers with the flat of the breaker cam the two contacts make to connect the primary winding in a closed circuit. Next as the shoe 47 rides off the flat of the breaker cam the contacts are opened to break the primary circuit. It is the collapse of the primary field which occurs as the primary circuit is broken that gives rise by induction to a high-tension voltage in the secondary winding.

Connected in parallel with the contacts 40 and 45 of the circuit breaker is an electrical condenser 56, the purpose of which is to quench the spark across the contacts as the contacts separate. One terminal of this condenser is connected by a lead 57 to a terminal lug secured to the bolt 50 by the screw 55. The other terminal of the condenser is formed by its container. This condenser is mounted in a hole 58 provided in the housing at one corner thereof. The condenser is retained in the mounting hole by a screw and washer generally referred to as 58a. By contact of the outer container of the condenser with the housing 10 the other terminal of the condenser is connected to ground. The mounting hole 58 for the condenser extends longitudinally of the rotor axis and is open at the base of the standard 12 and at the side of the shaft 22 opposite that at which the breaker arm is disposed. Thus, the lead 57 from the bolt 50 to the condenser does not have to cross the breaker arm.

In the position of the circuit breaker shown in Figure 2 the shaft 22 is to be driven in a counterclockwise direction. This is so that the frictional forces of the breaker cam on the shoe 47 will tend to tension the breaker arm and avoid therefore the secondary vibrational effects which would tend to be present were the forces reversed. However, each part of the circuit breaker is readily reversed to adapt the magneto for reverse rotation. For instance, the bracket 41 is removed, turned in a reverse direction and again clamped in place by the screw 42. Next the condenser and primary leads 57 and 31 are disconnected from the bolt 50, the bolt is removed, the breaker is then placed at the opposite side of the shaft 22 and the bolt is restored to clamp the breaker arm in place; also, the induction coil is now reversed to bring the lead-out wire 31 at the opposite side of the magneto. Thereafter the condenser and primary leads 57 and 31 are again connected to the bolt. In order though that the condenser lead 57 will not have to cross the breaker arm—the primary lead 31 having not to cross because of the reversal of the induction coil—there is provided a second mounting hole 59 in a corner portion of the housing 10 next adjacent the corner in which the hole 58 is provided (Figure 2).

Typically, the shaft 22 is coupled to the cam shaft of the engine whose ignition system the magneto serves, and is driven at one-half engine speed. In a one-cylinder engine it is desired to produce one ignition spark for every two revolutions of the engine. This would therefore be accomplished by a single flat on the shaft 22 from the breaker cam, the flat being so positioned on the shaft as to break the primary circuit of the induction coil when the current in that circuit is at a maximum value. Since there are two flux reversals in the stator per revolution of the rotor, to cause the current in the primary circuit to reach a maximum twice during each revolution of the rotor, the circuit breaker will, when having only one flat, interrupt the primary circuit every other instant the current in the primary circuit reaches a maximum value. At the intervening instants when the current in the primary winding reaches a maximum value there will not ordinarily be produced a high-tension voltage in the secondary winding because the primary circuit is not then interrupted; however, if there is a tendency for the magneto to generate ignition sparks during these unwanted intervening periods, the alternate unwanted voltage impulses in the induction coil may be suppressed by ways known in the art such for example as by using a non-symmetrical stator and rotor pole arrangement as taught by the Cunningham Patents 1,098,431 and 1,181,996.

An external lead wire 60 may be connected to the bolt 50 and lead, for example, to any suitable switch (not shown) for shorting the breaker contacts to cut out the magneto. Alternatively, the magneto may be cut out by a leaf spring 61 mounted in cantilever fashion on the housing 10 and having a free end portion depressible to contact the outer end of the bolt 50 and thus connect the breaker arm to the casing and to ground.

It will be understood that while I have herein disclosed a magneto for a single-cylinder engine, this magneto may be adapted for multicylinder engines, say a two-cylinder engine, by providing a breaker cam having two diametrically-opposite flats on the shaft 22. Also in such a magneto I may extend the length of the stator legs 27 to provide a suitable space between the shaft 22 and the induction coil 30 for a suitable distributor driven by the shaft 22 but which is herein unnecessary to show.

The magneto herein particularly described is intended as being illustrative and not limitative of my invention since the same is subject to changes and modifications without departure from the scope of my invention, which I endeavor to express by the following claims.

I claim:

1. In a magneto: the combination of a metal housing; a rotor in said housing; a stator having pole elements diametrically opposite said rotor and extending longitudinally of the rotor and having a core member bridging the outer ends of said pole elements; an induction coil on said core member; an interior metal standard on said housing extending from one side of said housing into the space between said pole elements and terminating short of the other side of the housing; a journal bearing in said standard; a shaft of said rotor extending through said bearing; a breaker cam on the end portion of said shaft beyond said bearing; and a circuit breaker mounted on said housing in the space between said stator pole elements and including a movable breaker arm coacting with said cam.

2. In a magneto including a metal housing: the combination of an integral interior standard on said housing projecting from one wall thereof partially to the opposite wall thereof; a rotor having a shaft journalled in said standard and extending therebeyond; a stator having pole elements at opposite sides of said rotor and extending longitudinally of the rotor past said standard, and a core element bridging the outer ends of said pole elements; an induction coil on said core element; a breaker cam on an end of said shaft in the space between said pole elements; and a circuit breaker comprising a breaker arm at the outer side of said standard having a free end portion actuatable by said breaker cam.

3. In a magneto: the combination of a cast metal housing, said housing having an axial opening extending therethrough and having a central transverse standard at one end extending from one wall of the housing partially to the other wall thereof; a closure member for the other end of said housing member; a rotor; bearings for said rotor mounted on said closure member and said standard respectively; a U-shaped stator structure having pole elements incast in the side walls of said housing in positions wherein they straddle said standard and are disposed parallel to the axis of said rotor; a cam on the end of said shaft beyond said standard; a fixed contact; a bracket carrying said fixed contact and mounted on said standard; a movable cooperating contact; and a breaker arm coacting with said cam and carrying said movable contact, said breaker arm being mounted on a side wall of said housing at the base of said standard and being disposed adjacent to said standard in the space between said pole elements.

4. The combination set forth in claim 3 wherein the mounting for said breaker arm comprises a clamping member extending through the base of said arm and through the wall of said housing to hold the base portion of the arm rigidly to the housing, said clamping member being electrically connected to said breaker arm and being insulated from said housing to serve as an electrical terminal of the magneto.

5. The combination set forth in claim 3 including a condenser electrically connected across said breaker contacts, wherein said breaker arm is reversible on said clamping member for coaction with said cam at either side of the rotor axis to adapt said magneto for rotation in either direction, and wherein said housing has two mounting holes at opposite sides of said standard open at said one end of the housing, one of said mounting holes being adapted to receive said condenser when said breaker arm is mounted for rotation of said magneto in one direction and the other being adapted to receive said condenser when said breaker arm is reversibly mounted for rotation of said magneto in a reverse direction.

6. In a magneto: the combination of a cast metal housing open at one end; a rotor having a shaft mounted in said housing for rotation in either direction; a U-shaped stator having pole elements incast in the side walls of said housing in positions diametrically opposite said rotor shaft and in parallel relation thereto and having a bridging element between said pole elements beyond said open end of the housing; a bearing support for said rotor shaft mounted on said housing at the open end thereof and positioned between said pole elements; a reversible circuit breaker including a cam on the end of the rotor shaft beyond said bearing support, a cooperating breaker arm and a mounting on said housing for said breaker arm adapted for holding the arm at one side of the rotor shaft to enable the magneto to operate with the rotor being driven in one direction and alternatively at the other side of the shaft to enable the magneto to operate with the rotor being driven in a reverse direction; a condenser connected across said circuit breaker; and mounting holes in said open end of the housing respectively at opposite sides of said bearing support and substantially parallel to said rotor shaft for receiving said condenser, said condenser being mounted in one or the other of said holes according to which side of said shaft said breaker arm is positioned.

GUSTAVE D. CERF.

REFERENCES CITED

The following references are of record in the file of this patent:

UNITED STATES PATENTS

| Number | Name | Date |
|---|---|---|
| 1,727,848 | Wilder | Sept. 10, 1929 |
| 1,828,895 | Hanley | Oct. 27, 1931 |
| 1,922,824 | Schick | Aug. 15, 1933 |
| 2,244,877 | Hanley | June 10, 1941 |
| 2,246,754 | Piffath | June 24, 1941 |
| 2,308,973 | Crocker | Jan. 19, 1943 |

Disclaimer 2,500,345.—*Gustave D. Cerf*, Livingston, N. J. MAGNETO. Patent dated Mar. 14, 1950. Disclaimer filed Oct. 4, 1951, by the assignee, *Thomas A. Edison, Incorporated*.

Hereby enters this disclaimer to claim 2 of said patent.

[*Official Gazette October 30, 1951.*]

Disclaimer 2,500,345.—*Gustave D. Cerf*, Livingston, N. J. MAGNETO. Patent dated Mar. 14, 1950. Disclaimer filed Dec. 22, 1952, by the assignee, *Wico Electric Company*.

Hereby enters this disclaimer to claim 1 of said patent.

[*Official Gazette January 27, 1953.*]